Patented Feb. 23, 1926.

1,574,118

UNITED STATES PATENT OFFICE.

WILLIAM K. SCHWEITZER, OF CLEVELAND, OHIO, ASSIGNOR TO THE GRASSELLI CHEMICAL COMPANY, OF CLEVELAND, OHIO, A CORPORATION OF OHIO.

PROCESS FOR THE PREPARATION OF INSECTICIDES.

No Drawing.    Application filed September 29, 1924.    Serial No. 740,634.

*To all whom it may concern:*

Be it known that I, WILLIAM K. SCHWEITZER, a citizen of the United States, residing at Cleveland, in the county of Cuyahoga and State of Ohio, have invented certain new and useful Improvements in Processes for the Preparation of Insecticides, of which the following is a specification.

By the interaction of manganese dioxid and arsenious oxid as described in an application Serial Number 654,781, filed July 30, 1923, in the name of Wellington Lee Tanner, there may be produced a product comprising an arsenate or aresnates of manganese, principally the dimanganoarsenate $MnHAsO_4$, running 40 percent or more of total arsenic oxid and approximately 2.5-3 percent of soluble arsenic oxid. The process of said application consists generally in heating an aqueous slurry of arsenious oxid and manganese dioxid or other oxidized compound of manganese, a preferred procedure being to heat to about its boiling temperature in an open vessel under agitation a slurry of pyrolusite or similar oxidized manganese ore and white arsenic in combining proportions, that is, in the proportions of 198 parts by weight of $As_2O_3$ to 174 parts by weight of $MnO_2$, in water in quantity amounting to from 10 to 15 times the weight of the pyrolusite containing nitric acid as a catalyst in quantity amounting to about 3 percent of the combined weights of the pyrolusite and white arsenic. In carrying out this reaction the manganese dioxid and arsenious oxid should be in combining proportions as indicated by the equation $$As_2O_3 + 2MnO_2 + H_2O = 2MnHAsO_4$$

in order to avoid on the one hand the presence in the reaction product of unreacted manganese dioxid which appears as black gritty particles, and on the other hand an excessive soluble arsenic content which is very difficult to remove by washing. The water content of the slurry should be just sufficient to permit free agitation or stirring. An excess of water retards the reaction. The temperature to which the slurry is heated may vary but the higher the temperature employed the more rapid is the reaction and the boiling temperature therefore is preferred. A higher temperature may be used if the reaction is carried out under superatmospheric pressure. The reaction may be carried to completion by a prolonged treatment in the absence of a catalyst but the use of a catalyst, generally of an acid character such as nitric acid, is preferred to hasten the reaction. The material of the reaction vessel has a decided influence upon the rate of the reaction. Using the preferred reaction conditions described above, the reaction is 95% or more complete in 6 hours in a reaction vessel made of glass, porcelain or the like; whereas in a lead reaction vessel 24 hours are required to reach 95% completion and in an iron reaction vessel the reaction is extremely slow. The product of reaction of manganese dioxid with arsenious oxid consists principally of dimanganoarsenate and when prepared under preferred reaction conditions contains in the neighborhood of 3% of soluble arsenic oxid.

I have now found that the soluble arsenic content of the reaction product of pyrolusite and arsenious oxid or a similar material consisting of or containing dimanganoarsenate may be materially reduced by treating the same with a compound capable of reacting with the dimanganoarsenate to form trimanganoarsenate. The neutral or only slightly alkaline carbonates of metals capable of forming insoluble arsenates such as manganese carbonate, calcium carbonate, and magnesium carbonate, are particularly suited for this purpose. If a strongly alkaline compound is employed, its reaction with the dimanganoarsenate will be similar to that of lime as indicated by the equation $$MnHAsO_4 + Ca(OH)_2 = CaHAsO_4 + Mn(OH)_2$$

whereas the reaction desired is as represented by the equation $$2MnHAsO_4 + MnCO_3 = Mn_3(AsO_4)_2 + CO_2 + H_2O.$$

The invention will be illustrated hereinafter by reference to the use of manganese carbonate which preferably is supplied in the form of rhodochrosite, it being understood that the invention is not limited thereto. Calcium and magnesium carbonates and mixtures thereof such as occur in dolomites used in equivalent amounts give results pratically identical with those produced by the use of manganese carbonate.

The treatment with manganese carbonate is as follows:

After the reaction between the pyrolusite and white arsenic is complete or nearly so, say 90% or more, manganese carbonate or rhodochrosite is added either directly to the reaction mixture or to the separated solid reaction products thereof slurried with water, and the resulting mixture heated and agitated. The purpose of this treatment being to decrease the water soluble arsenic content of the product, I have carried out a series of experiments to determine the quantity of manganese carbonate and the time of treatment required to give a product of the desired water soluble arsenic content.

I have found that a quantity of manganese carbonate amounting to 10% of the combined weights of the pyrolusite and white arsenic or the dimanganoarsenate reaction product produces substantially the maximum reduction in the soluble arsenic content of the product and that practically the maximum effect of a given quantity of manganese carbonate, is produced in 24 hours. The use of more than 10% of manganese carbonate and treatment for more than 24 hours or both produce substantially no effect not obtained by the treatment with 10% of manganese carbonate for 24 hours. I have further found that increasing the quantity of manganese carbonate from 5% to 10% produces very little effect and that the reaction is substantially complete in 18 hours. The use of 5% of manganese carbonate and a reaction period of about 18 hours therefore is a preferred procedure, but it is to be understood that the use of smaller amounts of manganese carbonate and a shorter reaction time to produce corresponding reductions in the water soluble arsenic content are embraced by my invention, and also that the use of more than 10% of manganese carbonate and a reaction time of more than 24 hours, although without substantial utility, are embraced by my invention.

The manganese carbonate reacts with a portion at least of the dimanganoarsenate in the pyrolusite—white arsenic reaction product, forming trimanganoarsenate as indicated in the foregoing reaction equation, and the water soluble arsenic content is reduced to an extent depending upon the quantity of manganese carbonate used and the time allowed for the reaction. Starting with a dimanganoarsenate containing material such as the reaction product of pyrolusite and white arsenic containing about 40% of total arsenic oxid and about 3% of soluble arsenic oxid, there may be produced a product containing about 40% total arsenic oxid and from 1 to 3% of soluble arsenic oxid. By using 10% of manganese carbonate and reacting for 24 hours the water soluble arsenic oxid content may generally be reduced to as low as 1%, and by using 5% of manganese carbonate and reacting for 18 hours a soluble arsenic oxid content of 1.5% or less may be obtained.

In the treatment of the dimanganoarsenate containing product with manganese carbonate the material of the reaction vessel has no noticeable effect upon the reaction. The quantity of water present also has very little effect upon the reaction, but for practical reasons should be only sufficient to permit thorough agitation.

The solid reaction porduct after being separated from liquid, washed, dried and pulverized is a white or light colored powder suitable for use as an insecticide.

I have found in lieu of using fresh water and a catalytic agent in making the original slurry of white arsenic and pyrolusite, that the liquors obtained from filtering off the reaction product either after the pyrolusite-white arsenic reaction, or after the carbonate treatment, provided there has been no separation of the product before the carbonate treatment, may be used in making a fresh suspension of pyrolusite and white arsenic without the addition of fresh catalysts and with but very little decrease in the speed of the pyrolusite-white arsenic reaction. It must be noted that the liquors after the pyrolusite-white arsenic reaction may still contain nitric acid, but after the carbonate treatment there will no longer be free nitric acid present but rather nitrates which serve as the catalytic agent.

I claim:—

1. Process which comprises digesting an aqueous slurry containing dimanganoarsenate and a substantially non-alkaline metal compound capable of reacting with dimanganoarsenate to form only less soluble arsenates.

2. Process which comprises digesting an aqueous slurry containing dimanganoarsenate and a carbonate of a metal capable of forming an insoluble arsenate.

3. Process which comprises digesting an aqueous slurry containing dimanganoarsenate and manganese carbonate.

4. Process which comprises heating to substantially boiling temperature with agitation an aqueous slurry containing dimanganoarsenate and a substantially non-alkaline carbonate of a metal capable of forming an insoluble arsenate.

5. Process which comprises heating and agitating an aqueous slurry containing dimanganoarsenate and manganese carbonate.

6. Process which comprises heating and agitating an aqueous slurry containing essentially dimanganoarsenate and manganese carbonate in quantity amounting to from 5 to 10 percent by weight of the dimanganoarsenate for from 18 to 24 hours at a temperature in the neighborhood of 100° C.

7. Process which comprises preparing an aqueous slurry of the solid reaction products of manganese dioxid with arsenious oxid with a carbonate of a metal capable of forming an insoluble arsenate, and heating and agitating the slurry.

8. Process which comprises adding a carbonate of a metal capable of forming an insoluble arsenate to a slurry of the reaction products of pyrolusite and white arsenic, and heating and agitating the resulting mixture.

9. Process which comprises mixing manganese dioxid and arsenious oxid in the proportion of about 198 parts by weight of arsenious oxid to 174 parts by weight of manganese dioxid with water in quantity amounting to from 10 to 15 times the weight of the manganese dioxid and nitric acid in quantity amounting to about 3% of the combined weights of the manganese dioxid and arsenious oxid, heating the mixture to about its boiling temperature and agitating it until substantially all of the manganese dioxid and arsenious oxid have combined, adding manganese carbonate in quantity amounting to from 5 to 10% of the combined weights of the manganese dioxid and arsenious oxid used, and heating the resulting mixture to about its boiling temperature with agitation for from 18 to 24 hours.

In testimony whereof, I affix my signature.

WILLIAM K. SCHWEITZER